US011455002B1

(12) United States Patent
Whyte et al.

(10) Patent No.: US 11,455,002 B1
(45) Date of Patent: Sep. 27, 2022

(54) TIMING SIGNAL SYNCHRONISATION

(71) Applicant: Cirrus Logic International Semiconductor Ltd., Edinburgh (GB)

(72) Inventors: Neil Whyte, Edinburgh (GB); Andy Brewster, Edinburgh (GB); Angus Black, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/331,967

(22) Filed: May 27, 2021

(51) Int. Cl.
*G06F 1/12* (2006.01)
*G06F 1/08* (2006.01)
*G06F 1/10* (2006.01)

(52) U.S. Cl.
CPC .................. *G06F 1/12* (2013.01); *G06F 1/08* (2013.01); *G06F 1/10* (2013.01); *H04R 2499/11* (2013.01); *H04R 2499/15* (2013.01)

(58) Field of Classification Search
None
See application file for complete search history.

(56) References Cited

U.S. PATENT DOCUMENTS

| 4,352,195 | A | * | 9/1982 | Dautremay | ........... H04L 7/0331 |
| | | | | | 331/25 |
| 5,125,107 | A | * | 6/1992 | Herold | .................... H03L 7/183 |
| | | | | | 455/226.1 |
| 9,628,211 | B1 | | 4/2017 | Stoler et al. | |
| 2014/0207983 | A1 | | 7/2014 | Jones et al. | |

FOREIGN PATENT DOCUMENTS

WO 2012134930 A1 10/2012

OTHER PUBLICATIONS

International Search Report and Written Opinion of the International Searching Authority, International Application No. PCT/GB2022/050699, dated Jul. 4, 2022.

* cited by examiner

*Primary Examiner* — Cassandra F Cox
(74) *Attorney, Agent, or Firm* — Jackson Walker L.L.P.

(57) ABSTRACT

A device comprising: a data interface comprising: a data input for receiving a data signal; a clock input for receiving a clock signal for clocking the data signal; and a timing input for receiving a first timing signal having a first frequency; and a timing signal generator configured to generate, based on the first timing signal and the data signal, a second timing signal having a second frequency, the first frequency being a integer multiple of the second frequency, a phase of the second timing signal being aligned with an event in the data signal.

21 Claims, 5 Drawing Sheets

TIMING SIGNAL SYNCHRONISATION

TECHNICAL FIELD

The present disclosure relates to methods and apparatus for synchronising timing signals across multiple secondary devices connected to a common host device.

BACKGROUND

Communication buses, comprising a clock line, a data line and a frame synchronisation line, are commonly used for synchronous serial data transfer between integrated circuits (ICs). Such solutions allow a host (or main or control) device or module to communicate with multiple secondary (or responder) devices or modules over the shared data line.

It is common for ICs to operate sub-components at different frequencies to reduce power consumption. To do so, secondary devices connected to a communication bus may generate secondary (lower frequency) timing signals by frequency dividing a timing signal (such as a frame synchronisation signal) received from the common host device. When multiple secondary devices all implement similar frequency division, a situation can arise where secondary (divided) timing signals are not phase-aligned across the multiple secondary devices. This may be undesirable in applications where separate secondary devices are trying to react in a synchronised manner across multiple channels, such as in stereo audio processing.

SUMMARY

According to an aspect of the disclosure, there is provided a device comprising: a data interface comprising: a data input for receiving a data signal; a clock input for receiving a clock signal for clocking the data signal; and a timing input for receiving a first timing signal having a first frequency; and a timing signal generator configured to generate, based on the first timing signal and the data signal, a second timing signal having a second frequency, the first frequency being a integer multiple of the second frequency, a phase of the second timing signal being aligned with an event in the data signal.

The event in the data signal may comprises a transition to a non-zero frame in the data signal.

The timing signal generator may be configured to align the phase of the second timing signal by resetting the timing signal generator in response to the event in the data signal.

The timing signal generator may comprises a frequency divider configured to divide the first timing signal by the integer multiple. The frequency divider may comprise one or more divide-by-2 counters.

The timing signal generator may be configured to generate the second timing signal with a fixed phase offset (e.g. a lag or lead) relative to the first timing signal.

The first timing signal may be a frame synchronisation signal.

The second timing signal may be a frame start signal.

The data signal may comprise audio data.

The data interface may be a serial data interface and the data signal may comprise one or more serial data words.

The device may further comprise an amplifier for driving a transducer.

The device may further comprising a digital signal processor.

According to another aspect of the disclosure, there is provided a system comprising: a host device configured to generate a first timing signal and a data signal; a plurality of devices such as those described above, the timing input of each of the plurality of devices configured to receive the first timing signal, the data input of each of the plurality of devices configured to receive the data signal, and the clock input of each of the plurality of devices configured to receive the clock signal.

The device or system described above may comprise one of a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method, comprising: receiving a first timing signal having a first frequency; receiving a data signal; generating, based on the first timing signal and the data signal, a second timing signal having a second frequency, wherein the first timing frequency is a integer multiple of the second frequency, and wherein a phase of the second timing signal is aligned with an event in the data signal.

The event in the data signal may comprise a transition of the data signal to a non-zero value.

Aligning the phase of the second timing signal may comprise resetting or enabling the timing signal generator in response to the event in the data signal.

The second timing signal may comprise dividing the first timing signal by the integer multiple.

The second timing signal may have a fixed phase offset (e.g. a lag or a lead) relative to the first timing signal.

The first timing signal may be a frame synchronisation signal. The second timing signal may be a frame start signal.

The data signal may comprise audio data.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to improvements in synchronisation of timing signals, such as those use for frame synchronisation. Such improvements are particularly advantageous in systems comprising a common host device and multiple downstream secondary devices. Embodiments of the present disclosure may be implemented in such secondary devices such that their respective internally generated timing signals can be phase-aligned, without the requirement for additional synchronisation signals, wires, trigger registers or special control codes in the data stream received from the host device.

Figure 1:
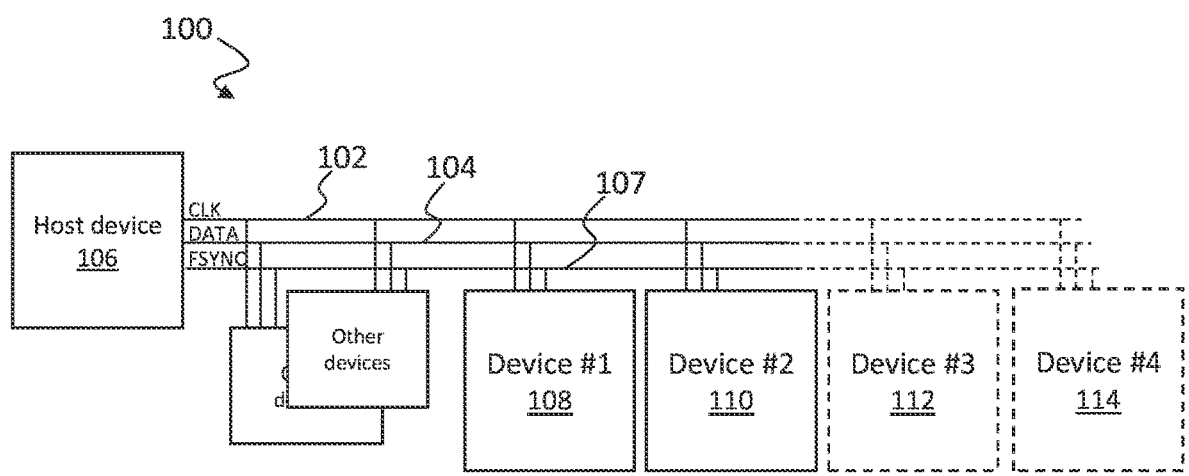
FIG. 1 is a schematic diagram of a bus architecture.

FIG. 1 is a schematic diagram of a serial bus architecture 100. The serial bus comprises a clock line 102, a data line 104 and a frame synchronisation (or sync) line 106. A host module 106, (also known in the art as a control module, or a primary module, or a main module, or a master module) communicates with a plurality of secondary modules 108, 110, 112, 114 (also known in the art as responder modules or slave modules) over the data line 104. In the example shown, a single host module 106 is provided. However, in practice, more than one host module can be provided. In the example shown, four secondary modules are provided. However, in practice, any number of secondary modules may be connected to the clock, data and frame sync lines 102, 104.

To send data to the secondary modules 108, 110, 112, 114, the host module 106 may transmit data over the data line 104. The host module 106 also transmits a clock signal over the clock line 102 for clocking the data sent over the data line 104. Each of the secondary modules 108, 110, 112, 114 may use the clock signal received over the clock line 102 to clock (and therefore decode) the data received over the data line 104.

In addition to the clock signal, the host module 106 may also transmit a timing signal (a frame sync signal or frame start signal) for frame synchronisation over the frame sync line 107. The frame sync signal is used to denote the start of a frame of data sent over the data line 104. Thus, the one or more secondary module 108, 110, 112, 114 may use the frame start signal to identify the start or beginning of each frame of data being sent over the data line 104.

In order to minimize power consumption, some functions of the secondary modules 108, 110, 112, 114 may be configured to operate at lower frequencies than others. As such, the secondary modules 108, 110, 112, 114 may generate secondary or tertiary timing signals having different frequencies to the timing signal provided over the frame sync line 107.

A conventional method of generating timing signals of different frequencies uses one or more frequency dividers. Frequency division techniques are common in the art and so will not be described in more detail here. However, a problem exists when multiple devices, such as the secondary modules 108, 110, 112, 114 all generate secondary timing signals using a frequency divider. Start-up times of the secondary modules 108, 110, 112, 114 and their sub-components may vary, leading to a potential phase offset between divided clock signals generated by each of the secondary modules 108, 110, 112, 114. For example, indeterminate timing of the software writes used to configure each secondary module 108, 110, 112, 114 and/or uncertainties due to clock domain crossing may cause one or more of the secondary modules 108, 110, 112, 114 to commence dividing a received timing signal from an odd frame and one or more others of the secondary modules 108, 110, 112, 114 to commence dividing a received timing signal from an even frame. This may lead to a phase offset between generated secondary timing signals.

Figure 2:
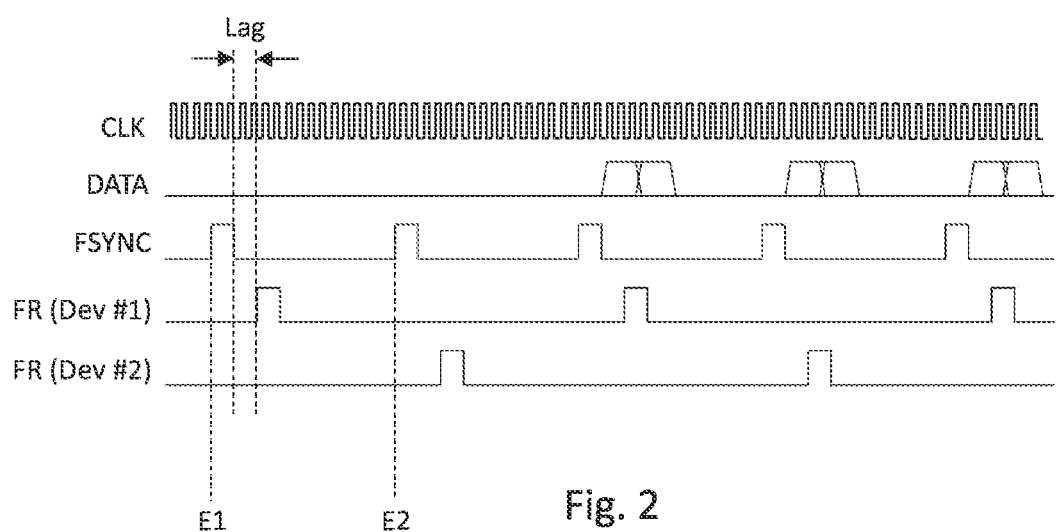
FIG. 2 is a timing diagram showing timing signal generated by a frequency divider of a secondary device of FIG. 1.

FIG. 2 is a timing diagram illustrating this problem. The timing diagram shows the frame sync signal FSYNC alongside example divided timing signals FR1, FR2 generated by first and second secondary devices 108, 110 respectively using conventional methods. In this example, generation of the first divided timing signal FR1 commences at or before the first edge E1 of the frame sync signal FSYNC. As such, oscillation of the first divided timing signal FR1 coincides with the first edge E1 and every other oscillation of the frame sync signal FSYNC thereon. In this example, the first divided timing signal FR1 lags behind the frame sync signal FSYNC as denoted by "Lag" in FIG. 3. Such lag is provided to remove any uncertainties due to clock domain crossing. Such lag is not, however, a requirement and may not be present in other examples. In contrast to the first divided timing signal FR1, due to a delay in start-up of the second secondary device 110 relative to the first secondary device 108 (in this example only), generation of the second divided timing signal FR2 commences after the first edge E1 of the frame sync signal FSYNC but before the second edge E2. As such, oscillation of the second divided timing signal FR2 coincides with the second edge E2 and every other oscillation of the frame sync signal FSYNC thereon. Because of this, the first and second divided timing signals FR1, FR2 are not phase aligned, but are in fact 50% out of phase (taking into account a similar lag in FR2 as that described above with respect to FR1).

Thus, it can be seen that the phase of the divided timing signals FR1, FR2 will depend on which edge of the frame sync signal FSYNC is used to generate the divided timing signals FR1, FR2. At high frequencies, this difference in frequency of the divided timing signals FR1, FR2 can detrimentally affect performance of the system 100. This phase difference is particularly detrimental in high frequency audio applications, for example, where the first and second secondary modules 108, 110 are configured to output left and right channel audio. In which case left and right audio channels can be up to 50 degrees out of phase.

Embodiments of the present disclosure aim to address or at least ameliorate the above described issues by using the data signal transmitted over the data line 104 to synchronise timing signal division between multiple secondary devices 108, 110, 112, 114 to improve the functionality of the system 100. Specifically, an event in the data signal transmitted on the data line 104 can be used by multiple secondary devices 108, 110, 112, 114 to initiate division of a received frame sync signal FSYNC. Since the frame sync signal FSYNC and the data signal DATA are both generated by the host module 106, the timing of events in the data signal DATA, such as the first non-zero data frame can be substantially guaranteed between different secondary modules 108, 110, 112, 114.

Figure 3:
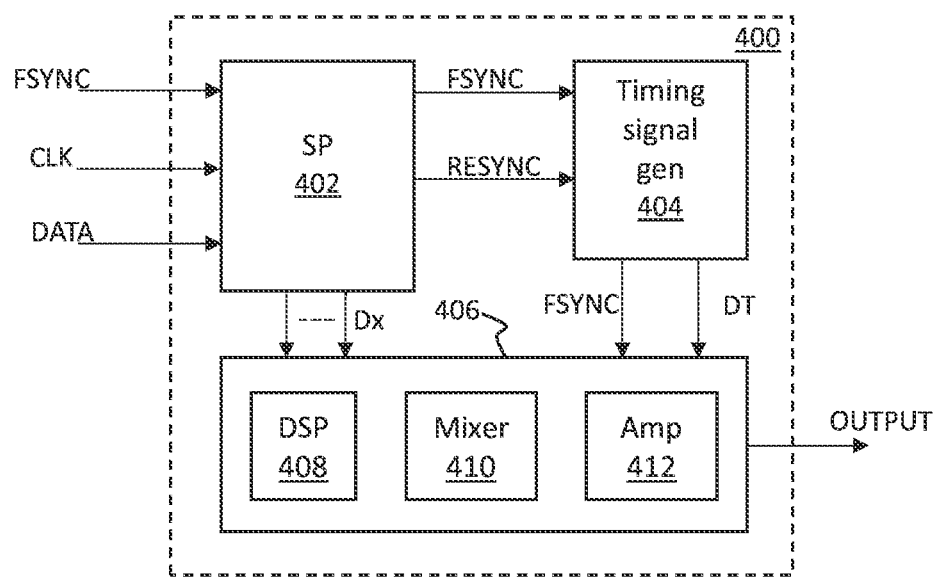
FIG. 3 is schematic illustration of a secondary device according to embodiments of the present disclosure.

FIG. 3 is a schematic diagram of an example secondary device 400 according to embodiments of the present disclosure. In the example shown, the secondary device 400 is an audio device configured to drive a loudspeaker (not shown). Embodiments of the present disclosure are not, however, limited to such applications and may be applied to any device in which a timing signal is generated by frequency division.

The secondary device 400 may be provided in place of any one of the secondary devices 108, 110, 112, 114 described with reference to FIGS. 1 to 3 and may be configured to communicate with the host device 106 in a similar manner to that described above.

The secondary device 400 comprises a serial port 402, a timing signal generator 404 and a mixed frequency subsystem 406 for generating an audio output signal OUTPUT.

The secondary device 400 is configured to receive a frame sync signal FSYNC, a clock signal CLK and a data signal DATA at a data interface, in this case the serial port 402. The serial port 402 is configure to deserialise the data signal DATA using the clock signal CLK and the frame synchronisation signal FSYNC. The deserialised data Dx may then be provided to the mixed frequency subsystem 406 for processing. In contrast to convention, the serial port 402 is further configured to output to the timing signal generator 404 the frame sync signal FSYNC (which in other embodiments may be input directly to the timing signal generator 404, bypassing the serial port 402) and a resynchronisation (resync) signal RESYNC generated based on the received data signal DATA.

In some embodiments, the resync signal RESYNC may be generated when data is detected in the data signal DATA, for example, by detecting a transition between a zero value and a non-zero value in the data signal DATA. To do so, the serial port 402 may monitor the (serial) data signal DATA or the deserialised data signal Dx to determine whether data is present in the data signal DATA received at the secondary module 400. In some embodiments the data signal DATA may be encoded in 2-s complement. In which case, a non-zero result of a logical OR of the data lines in the deserialised data Dx will indicate a non-zero value in the received data signal DATA. As such, the serial port 404 may perform an OR operation on the deserialised data Dx and output the result as the resync signal RESYNC. As such, when data is first received in the data signal DATA, the resync signal RESYNC transitions from low to high (or high to low).

In some embodiments, the resync signal RESYNC may be generated by monitoring for predetermined value in the data signal DATA. For example, the serial port 402 may monitor for a predetermined bit combination or byte of data. In which case, the serial port 402 may monitor the received data signal DATA or the deserialised data Dx.

The mixed frequency subsystem 406 is configured to operate at multiple frequencies. The mixed frequency subsystem 406 may comprise one or more of a digital signal processor (DSP) 208 and a mixer 210, for generating one or more audio signals based on the deserialised data, and an amplifier 212 for amplifying the generated one more audio signals for output to a loudspeaker (not shown). Additionally or alternatively, the mixed frequency subsystem 406 may comprise other modules (not shown) configured to operate using one or more timing signals.

The mixed frequency subsystem 406 may receive a plurality of timing signals from the timing signal generator 404. In the example shown, the mixed frequency subsystem 406 is configured to receive the frame sync signal FSYNC and a divided timing signal DT, having a frequency which is an integer divisor of the frequency of the frame sync signal FSYNC. In other words, the frequency of the frame sync signal FSYNC is an integer multiple of the frequency of the divided timing signal DT.

The timing signal generator 404 is configured to generate the divided timing signal DT based the frame sync signal FSYNC and the resync signal RESYNC. Specifically, the timing signal generator 404 may use the resync signal RESYNC as a trigger to commence or synchronise timing of division of the frame sync signal FSYNC to generate the divided timing signal DT.

In some embodiments, the timing signal generator 404 may divide the frame sync signal FSYNC using a frequency divider. For example, if it desired that the divided timing signal DT has a frequency half that of the frame sync signal FSYNC, the timing signal generator may comprise a divide-by-two counter. The resync signal RESYNC may then be used to reset or otherwise synchronise division by the divide-by-two counter.

Figure 4:
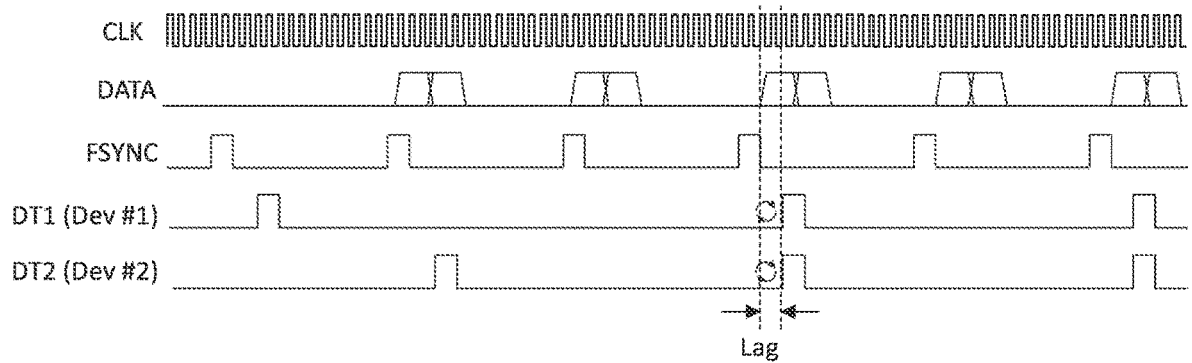
FIG. 4 is a timing diagram showing timing signals generated by multiple ones of the secondary device of FIG. 3.

FIG. 4 is an exemplary timing diagram showing the timing of generation of first and second divided timing signals DT1, DT2 during start-up of two devices (referred to in FIG. 5 as Dev #1 and Dev #2), such as the secondary device 400, operating in the system 100 shown in FIG. 1. The frame sync signal FSYNC is transmitted by the host device 106 over the frame sync line 107 and is received substantially simultaneously by each secondary device 400. Likewise, the data signal DATA is transmitted by the host device 106 over the data line 104 and is received substantially simultaneously by each secondary device 400. The clock signal CLK is transmitted by the host device 106 over the clock line 102 and is also received substantially simultaneously by each secondary device 400. Upon receipt of the frame sync signal, the timing signal generator 404 of each secondary device 400 generates their respective timing signal (first and second timing signals DT1, DT2). It can be seen in this example that the timing signals DT1, DT2 generated by each secondary device 400 are out of phase.

Upon receipt of a non-zero value on the data line 104, a respective resync signal RESYNC is generated and provided to the timing signal generator 404 of each secondary device 400. Responsive to the resync signal RESYNC, the timing signal generator 404 of each secondary device 400 may then synchronisation generation of their respective first and second timing signals DT1, DT2 to the resync signal RESYNC and therefore the receipt of the non-zero value on the data line 104. As such, that the first and second divided timing signal DT1, DT2 generated by the respective timing signal generators 404 of each secondary device 400 (Dev #1, Dev #2) are in phase, the first divided timing signal DT1 having been synchronised with the second divided timing signal DT2.

Figure 5:
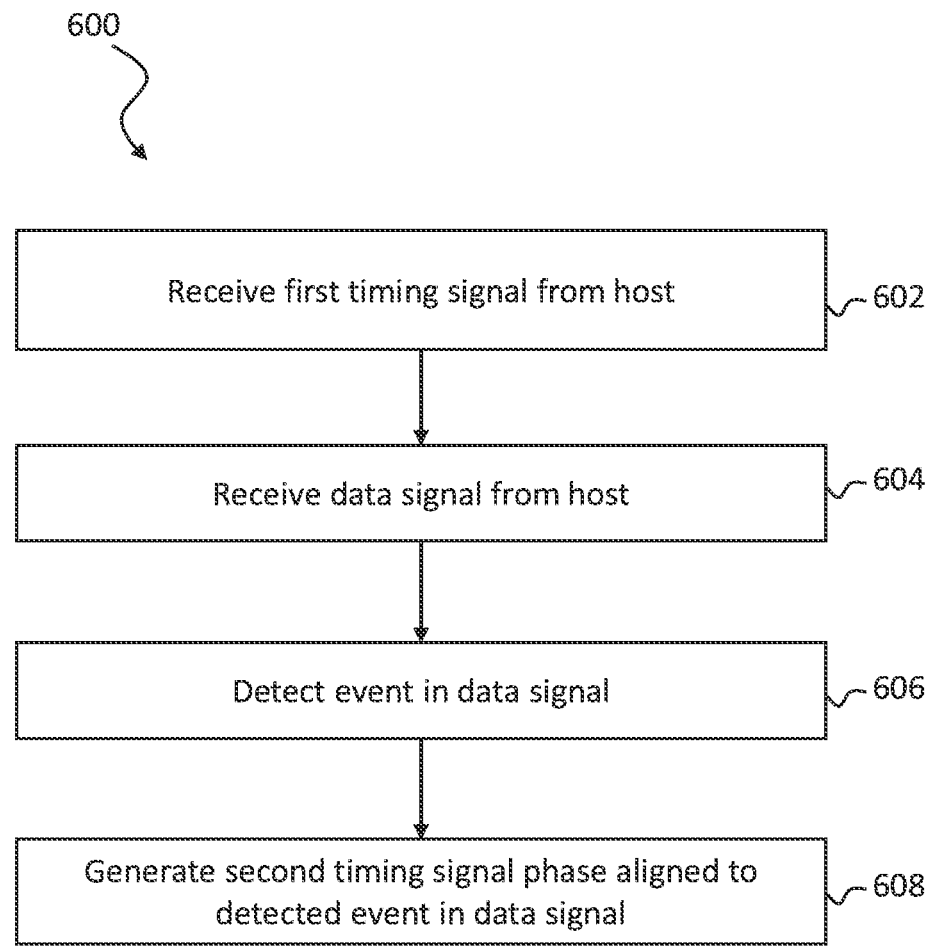
FIG. 5 is a flow diagram illustrating a process according to embodiments of the present disclosure.

FIG. 5 is a flow diagram illustrating a process 600 which may be implemented by the secondary device 400 for generating an second timing signal based on a received timing signal (e.g. a frame synchronisation signal FSYNC) from a host device, such as the host device 106 described above.

At step 602, the secondary device 400 receives a first timing signal from the host device 106. The first timing signal may be a frame synchronisation signal configured to indicate timing of frames in a data signal DATA also received from the host device 106, for example over the data line 104. The secondary device 400 may also receive a clock signal CLK over the clock line 102 for clocking the data signal DATA.

At step 604, the secondary device 400 receives the data signal DATA over the data line 104. The data signal DATA may be received at the same time or after commencement of receipt of the first timing signal.

At step 606, the secondary device 400 may detect an event in the data signal DATA. The event may be detected by the serial port 402 or the timing signal generator 404 of the secondary device 400. In some embodiments, the event may comprise a transition of the data signal DATA to a non-zero value. Such a transition may, for example, by detected by first deserialising the data signal DATA and then performing an OR operation on the deserialised data Dx. Additionally or alternatively, the event may be detected by monitoring a transition of the data signal DATA from high to low or from low to high. In some embodiments, the event may comprise the transmission of a predetermined value in the data signal DATA e.g. a specific combination of bits or bytes. In which case, the serial port 402 or the timing signal generator 404 may monitor the data signal DATA or the deserialised data Dx for the predetermined value.

At step 608, on detecting of the event in the data signal, the secondary device 400 may generate a timing signal substantially phase aligned with the detected event in the data signal DATA or substantially phase aligned with an edge of the first timing signal nearest the detected event in the data signal DATA.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A device comprising:
 a data interface comprising:
  a data input for receiving a data signal;
  a clock input for receiving a clock signal for clocking the data signal; and
  a timing input for receiving a first timing signal having a first frequency; and
 a timing signal generator configured to generate, based on the first timing signal and the data signal, a second timing signal having a second frequency, the first frequency being a integer multiple of the second frequency, a phase of the second timing signal being aligned with an event in the data signal.

2. The device of claim 1, wherein the event in the data signal comprises a transition to a non-zero frame in the data signal.

3. The device of claim 1, wherein the timing signal generator is configured to align the phase of the second timing signal by resetting the timing signal generator in response to the event in the data signal.

4. The device of claim 1, wherein the timing signal generator comprises a frequency divider configured to divide the first timing signal by the integer multiple.

5. The device of claim 4, wherein the frequency divider comprises one or more divide-by-2 counters.

6. The device of claim 1, wherein the timing signal generator is configured to generate the second timing signal with a fixed phase offset relative to the first timing signal.

7. The device of claim 1, wherein the first timing signal is a frame synchronisation signal.

8. The device of claim 1, wherein the second timing signal is a frame start signal.

9. The device of claim 1, wherein the data signal comprises audio data.

10. The device of claim 1, wherein the data interface is a serial data interface and the data signal comprises one or more serial data words.

11. The device of claim 1, further comprising an amplifier for driving a transducer.

12. The device of claim 1, further comprising a digital signal processor.

13. A system comprising:
a host device configured to generate a first timing signal and a data signal;
a plurality of devices according to claim 1, the timing input of each of the plurality of devices configured to receive the first timing signal, the data input of each of the plurality of devices configured to receive the data signal, and the clock input of each of the plurality of devices configured to receive the clock signal.

14. The device of claim 1, wherein the device comprises one of a mobile computing device, a laptop computer, a tablet computer, a games console, a remote control device, a home automation controller or a domestic appliance, a toy, a robot, an audio player, a video player, or a mobile telephone, and a smartphone.

15. A method, comprising:
receiving a first timing signal having a first frequency;
receiving a data signal;
receiving a clock signal for clocking the data signal; and
generating, based on the first timing signal and the data signal, a second timing signal having a second frequency, wherein the first timing frequency is a integer multiple of the second frequency, and wherein a phase of the second timing signal is aligned with an event in the data signal.

16. The method of claim 15, wherein the event in the data signal comprises a transition of the data signal to a non-zero value.

17. The method of claim 15, wherein aligning the phase of the second timing signal comprises resetting the timing signal generator in response to the event in the data signal.

18. The method of claim 15, wherein generating the second timing signal comprises dividing the first timing signal by the integer multiple.

19. The method of claim 15, wherein the second timing signal has a fixed phase offset relative to the first timing signal.

20. The method of claim 15, wherein the first timing signal is a frame synchronisation signal.

21. The method of claim 15, wherein the data signal comprises audio data.

* * * * *

UNITED STATES PATENT AND TRADEMARK OFFICE
CERTIFICATE OF CORRECTION

| | |
|---|---|
| PATENT NO. | : 11,455,002 B1 |
| APPLICATION NO. | : 17/331967 |
| DATED | : September 27, 2022 |
| INVENTOR(S) | : Whyte et al. |

It is certified that error appears in the above-identified patent and that said Letters Patent is hereby corrected as shown below:

On the Title Page

In Item (57), under "ABSTRACT", in Column 2, Line 8, delete "a integer" and insert -- an integer --, therefor.

In the Specification

In Column 1, Line 41, delete "a integer" and insert -- an integer --, therefor.

In Column 2, Line 19, delete "a integer" and insert -- an integer --, therefor.

In Column 2, Line 49, delete "is schematic" and insert -- is a schematic --, therefor.

In Column 2, Line 57, delete "DESCRIPTION OF EMBODIMENTS" and insert -- DETAILED DESCRIPTION OF EMBODIMENTS --, therefor.

In Column 2, Line 60, delete "use" and insert -- used --, therefor.

In Column 3, Line 5, delete "line 106." and insert -- line 107. --, therefor.

In Column 3, Lines 15-16, delete "lines 102, 104." and insert -- lines 102, 104 and 107. --, therefor.

In Column 3, Line 30, delete "module" and insert -- modules --, therefor.

In Column 3, Line 52, delete "module" and insert -- modules --, therefor.

In Column 4, Line 64, delete "configure" and insert -- configured --, therefor.

In Column 5, Line 15, delete "module 400." and insert -- device 400. --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 11,455,002 B1

In Column 5, Line 15, delete "embodiments" and insert -- embodiments, --, therefor.

In Column 5, Line 19, delete "serial port 404" and insert -- serial port 402 --, therefor.

In Column 5, Line 34, delete "(DSP) 208 and a mixer 210," and insert -- (DSP) 408 and a mixer 410, --, therefor.

In Column 5, Line 36, delete "amplifier 212" and insert -- amplifier 412 --, therefor.

In Column 5, Line 51, delete "based the" and insert -- based on the --, therefor.

In Column 5, Line 59, delete "it desired" and insert -- it is desired --, therefor.

In Column 6, Line 22, delete "synchronisation" and insert -- synchronise --, therefor.

In Column 6, Line 33, delete "an second" and insert -- a second --, therefor.

In Column 6, Line 54, delete "by detected by" and insert -- be detected by --, therefor.

In Column 7, Line 45, delete "telephone for" and insert -- telephone, for --, therefor.

In the Claims

In Column 8, Line 65, in Claim 1, delete "a integer" and insert -- an integer --, therefor.

In Column 10, Line 15, in Claim 15, delete "a integer" and insert -- an integer --, therefor.

In Column 10, Lines 23-24, in Claim 17, delete "the timing signal generator" and insert -- a timing signal generator --, therefor.